April 9, 1957     H. F. CLARK     2,788,413
ELECTRICAL APPARATUS
Filed March 10, 1954     3 Sheets-Sheet 1
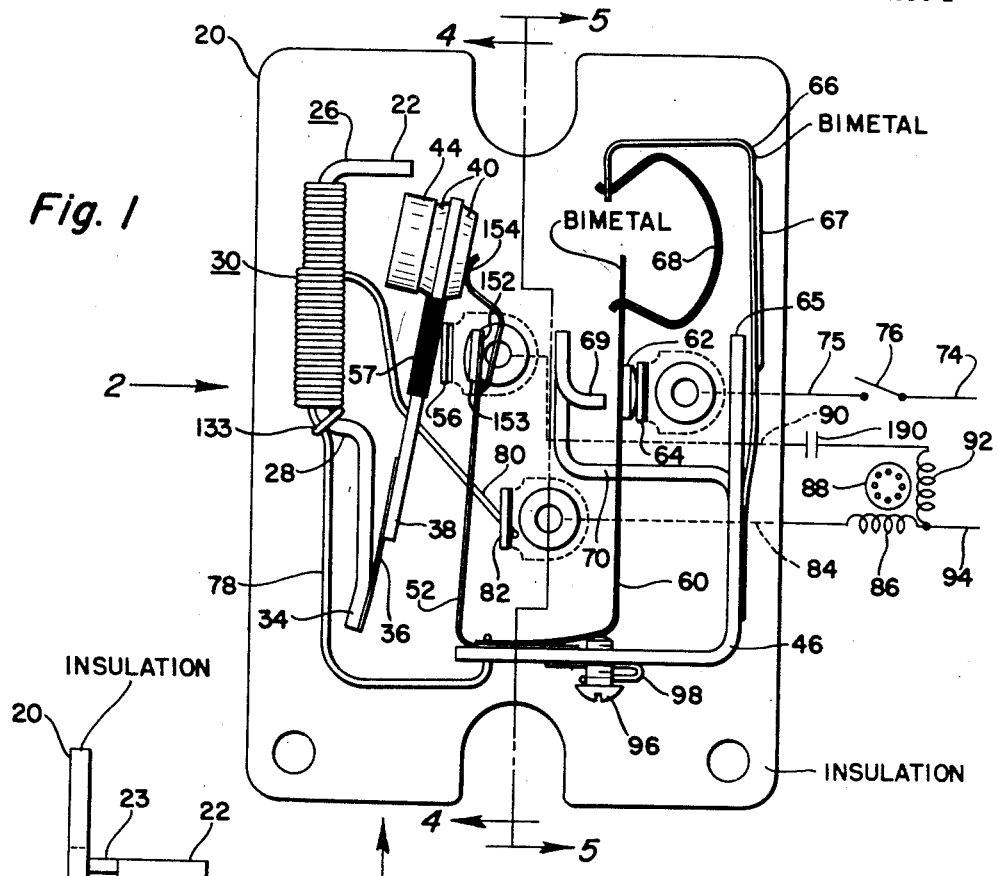
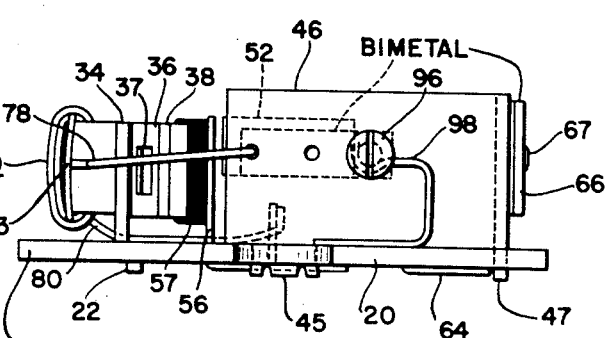
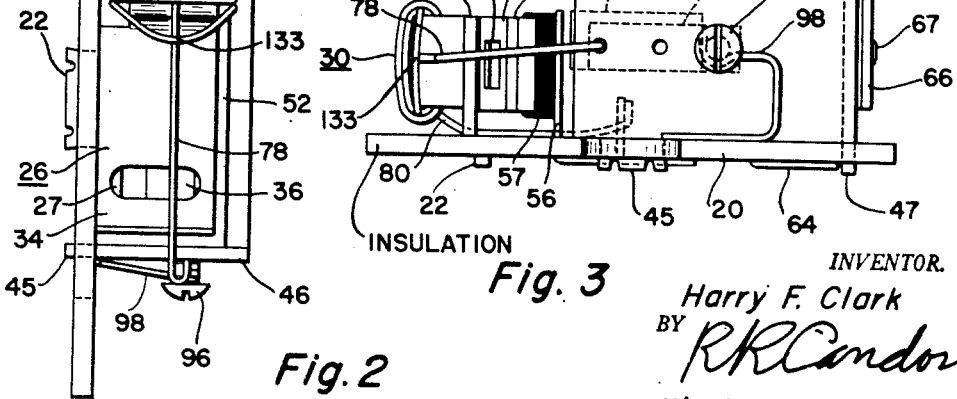
INVENTOR.
Harry F. Clark
BY R R Candor
His Attorney

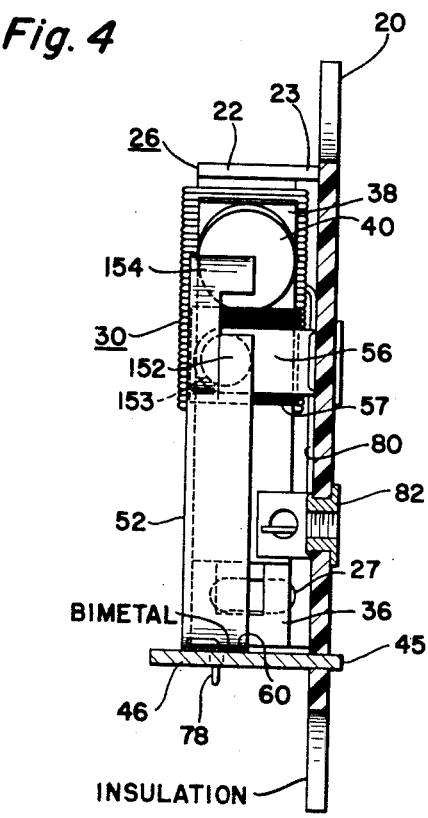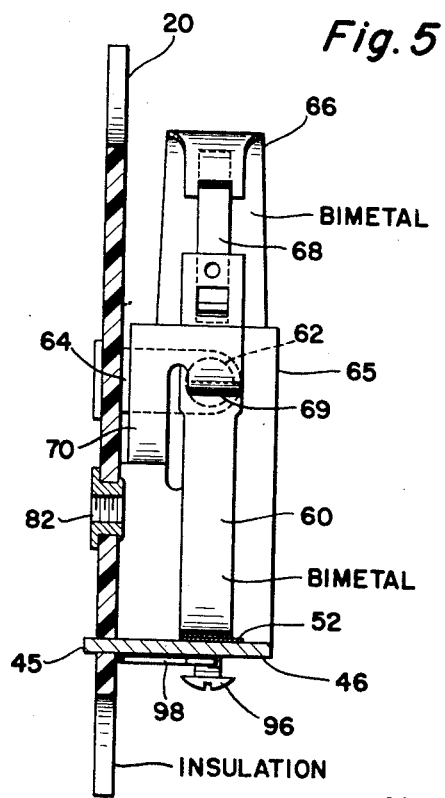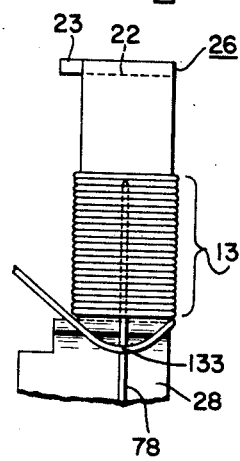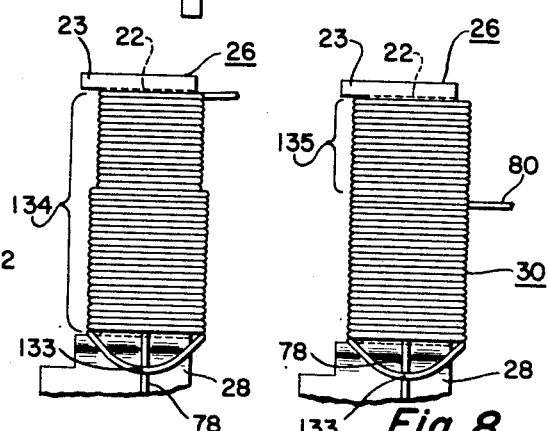

INVENTOR.
Harry F. Clark
BY R R Condor
His Attorney

2,788,413

ELECTRICAL APPARATUS

Harry F. Clark, Dayton, Ohio, assignor to General Motors Corporation, Detroit, Mich., a corporation of Delaware Application March 10, 1954, Serial No. 415,192

3 Claims. (Cl. 200—87)

This application is a continuation-in-part of my copending application S. N. 361,198, filed June 12, 1953.

This invention relates to electrical apparatus and more particularly to an improved electromagnetic starting system for small high torque split phase electric motors.

Single phase induction motors are provided with a phase winding for starting. A starting control is provided for insuring the full energization of such a winding during the starting period of the motor and to deenergize or reduce the energization of such a winding after the peak torque of the motor has been reached on both windings. The opening of the phase winding circuit at the proper time as well as the design of the motor determines the maximum starting torque which can be exerted.

It is an object of my invention to provide an inexpensive electromagnetic starting relay which will insure the satisfactory energization of the phase winding of more than one type and size of motor over as wide a voltage variation in single phase power supply as may be found throughout the United States.

It is another object of my invention to provide an inexpensive electromagnetic starting relay which will close instantaneously and which will deenergize or change the energization of the phase winding when the proper speed range is reached under a wide variation in voltage supply such as below 85 volts to above 135 volts.

It is another object of my invention to provide a dual range electromagnetic starting relay which under low main winding and relay currents will without being pulled in far enough to completely close the magnetic circuit operate at a low differential to close and open the phase winding circuit at suitable times and which under high main winding and relay circuits will at a higher differential operate to pull in completely to close the magnetic circuit and to close and open the phase winding circuit at suitable times.

It is another object of my invention to provide an inexpensive dual range electromagnetic starting relay which is easily set for operation under a wide variation in voltage supply and for several types and sizes of small high torque split phase motors.

It is another object of my invention to provide an inexpensive multiple purpose electromagnetic starting relay with a main electromagnet coil and a short circuited electromagnetic coil in which the relationship and the number of turns of each are proportioned so as to reduce the differential of the relay.

These and other objects are attained by winding as a single unit the main electromagnet coil and the opposed or bucking short circuited electromagnet coil upon a flat bar offset at one end of the coils and bent laterally in the same direction to form a hooked end at the other end of the coils. This flat bar is staked edgewise at two locations to a flat base of electrical insulating material. The offset portion serves as a leaf spring hinge support for the flat bar armature extending parallel to the coils which carries a lead weight and a felt cushion to minimize chattering.

The base also has staked edgewise to it a second flat bar member which carries the operating bimetal and the compensating bimetal of a snap acting thermal overload switch mechanism connected to one side of the supply source. This second bar carries the anchored end of a leaf spring contact mechanism carrying a contact spring biased into engagement with a stationary contact separately supported by the base. The spring hinge support for the armature has slightly greater force and is biased in the opposite direction to the spring force of the leaf spring contact mechanism. The leaf spring of the contact mechanism has an auxiliary spring arm extending into contact with the armature in the position in which the armature is fully released. This contact is maintained until after the armature is pulled beyond the position in which the stationary contact is engaged.

The main electromagnet coil is connected in series with the main winding circuit and is sufficiently weak that at low voltages the armature will only be attracted far enough to close the contacts and operate at the low differential while the higher voltages and currents will completely attract the armature with a higher differential between closing and opening movements. This results in a relay which will satisfactorily start small high torque split phase motors over a wide range of voltages and loads.

Further objects and advantages of the present invention will be apparent from the following description, reference being had to the accompanying drawings, wherein a preferred form of the invention is clearly shown.

In the drawings:

Figure 1 is a plan view of one form of starting relay and overload protector embodying my invention together with a diagram of the split phase motor circuit;

Figure 2 is a left side view of Figure 1;

Figure 3 is a bottom view of Figure 1;

Figure 4 is a sectional view taken substantially along the lines 4—4 of Figure 1;

Figure 5 is a sectional view taken substantially along the line 5—5 of Figure 1;

Figure 6 is a fragmentary view showing the side of the bucking coil as the first winding layer of the electromagnet coil;

Figure 7 is a fragmentary view illustrating the second winding layer of the electromagnet coil;

Figure 8 is a fragmentary view illustrating the third winding layer of the electromagnet coil;

Figure 9:
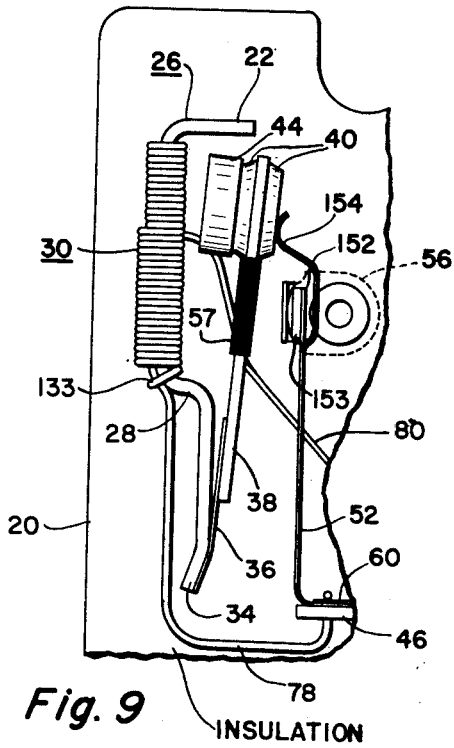
Figure 9 is a view showing the position of the armature and the contact mechanism in the low range closed position.

Referring now to the drawings and more particularly to Figures 1 to 3 there is shown a thin flat rectangular base 20 of electrical insulating material such as phenol-formaldehyde resin. Staked edgewise by the projection 22 extending through a long slot in the base 20 is a soft iron core strip 26 having an offset portion 28. The opposite or upper end of the core strip 26 is provided with a hooked or bent end 22. This hooked or bent end 22 is provided with a supporting leg 23. Between the hook or bent end 22 and the offset portion 28 is an electromagnet coil 30. The opposite end of the offset portion 28 of the core strip 26 is provided with a transverse horizontal aperture 27 which facilitates the bending of the bent end portion 34.

Welded directly to this bent end portion 34 is the lower end of a thin hinge spring 36 preferably of beryllium copper. To lower its spring force the intermediate portion of the hinge spring 36 is provided with a central rectangular aperture 37. Welded directly to the opposite end of the hinge spring 36 is a flat bar armature 38 which like the core strip 26 is made of a strip of soft iron or other suitable magnetic material. The spring 36 is substantially flat when unstressed and along with the flat bar armature 38 extends substantially parallel to the face of the bar portion 34 which may be bent for adjustment. The upper or opposite end of the flat bar armature 38 is provided with a lead weight 40 extending in the form of a large headed rivet through an aperture in the upper end of the armature 38. The leaf spring 36 normally holds the armature 38 against the rear face of an L-shaped stationary contact 56 which projects perpendicularly through a slot in the base 20 and which has a parallel portion beneath the base which is riveted to the base by an extruded eyelet. The armature in the portion adjacent the contact 56 is wrapped with a strip of electrical insulating material 57.

On the opposite side of the base 20 there is staked edgewise a reversed L- or Y-shaped flat bar member 46 having staked projections 45 and 47 extending through properly located slots in the base 20. Welded to the adjacent base end of this bar member 46 is the base of an L-shaped leaf spring contact member 52. Also welded to this portion of the bar member 46 is the base of a reversed L-shaped bimetal member 60 carrying a contact 62 adapted to cooperate with the L-shaped stationary contact 64 having a portion projecting perpendicularly through an appropriately located slot in the base and having a parallel portion beneath the base which is riveted to the base by an extruded eyelet as shown. This contact 64 is connected by the conductor 75 and an "Off-On" switch 76 to the supply conductor 74.

Welded to the outer face of the bar 46 is a hooked bimetal member 66 provided with an intermediate stiffening rib 67 to limit the bowing of the intermediate portion of the bimetal. Above the portion of the bar member 46 to which the bimetal 66 is welded there is a straight extension 65 which serves as a stop to limit the bowing of the bimetal 66 in the counterclockwise direction about its anchorage. The bar member 46 is also provided with an offset projection 70 provided with a smaller projection 69 which is turned toward the portion of the bimetal member 60 directly opposite the contact 62. The upper portion of the bimetal 60 is provided with a rectangular aperture which receives the lower hooked end of a reversed C-shaped toggle spring 68 which preferably is made of two thin strips of spring steel in contact with each other throughout. The upper end of this toggle spring 68 is held within a notch in the extreme hook end portion of the bimetal 66.

The bimetal 60 is adjusted by a set screw 96 threaded through the lower portion of the bar 46 into contact with the base portion of the bimetal 60. This adjusting screw 96 is normally held from rotation by a spring 98 of the configuration shown in Figure 3 which imparts a sufficient frictional force to prevent the accidental rotation of the screw 96. Since the contact 64 is connected directly to the supply conductor 74 substantially all the current will flow through the contact 62 and the bimetal 60. When this current flow is above a predetermined limit the bimetal 60 will be heated and will bow in the counterclockwise direction to separate the contacts 62 and 64 and to move the bimetal 60 into engagement with the stop 69. This opening movement will be opposed by the toggle spring 68, which together with the location of the contact 64 and the adjustment of the adjusting screw 96 will determine the current value at which the overload contacts 62 and 64 are opened. When the bimetal 60 cools sufficiently, the bimetal 60 will acquire sufficient force to overcome the force of the toggle spring 68 and move clockwise until the contact 62 reengages the contact 64. Welded or soldered to the base portion of the bimetal 60 is an insulated conductor 78 for conducting current to the electromagnet coil 30.

The difficulty of providing a suitable electromagnetic starting relay for a ⅛ horse power high torque split phase refrigerator motor caused by the wide variations in supply voltages as a result of different local power supply conditions in the U. S. A. is illustrated in the current-voltage diagram of Figure 11. In this diagram, the resulting change current in the main winding in amperes is plotted against the variations in supply voltages varying from 80 to 140 causing the change in current. It will be seen that under initial starting conditions (equivalent to a locked rotor) the main winding current will vary from about six to more than ten amperes within this wide voltage range as shown by the two upper curves. Beneath these upper curves is a set of four curves setting forth the amperes in the main winding at balance speed for various loads. Balance speed represents the highest speed attained with both windings fully energized. This balance speed varies from about 1700 R. P. M. to 1725 R. P. M. under no load. Preferably the phase winding is disconnected when the peak torque is reached at between about 1400 and 1500 R. P. M. However, satisfactory starting can be obtained when the phase winding is disconnected at any point between peak torque and balance speed. It will be seen that at 90 volts the relay must be picked up at less than six amperes current. However, should the voltage be as high as 130 volts and at 150% load the relay would have to drop out at about six amperes. This sets up an impossible condition for ordinary electromagnetic relay operation.

According to my invention to make operation possible and satisfactory, I so arrange the relay that within the range between 85 and 107 volts the relay will pick up at 5.5 amperes and drop out at 5.3 amperes. Above 107 volts the relay will pick up at 7.5 amperes and drop out at 6.2 amperes. This dual range operation is accomplished by the contact arrangement and the proper proportioning of all the forces including the leaf spring contact member 52 and its auxiliary spring 154 opposed by the hinge spring 36 together with a suitable electromagnetic coil 30 with an unusually wide air gap between the bent end 22 and the adjacent end of the armature bar 38. The leaf spring contact member 52 has its upper end split as shown best in Figure 4 to provide one spring arm 152 carrying the contact 153. The other split portion forms an auxiliary spring arm 154 having an offset portion engaging the lead weight 40. The hinge spring 36 is so thin that it has a very low spring rate which is just sufficient to overcome the opposing spring force of the leaf spring contact member 52 when the lead weight 40 on the armature bar 46 engages the auxiliary spring arm 154 and moves the leaf spring contact member 52 in the clockwise direction until the insulating strip 57 engages the contact 56 as shown in Figure 1.

In the position shown in Figure 1, the force of the leaf spring contact member 52 in the counterclockwise direction very nearly balances the force of the spring 36 in the opposite direction. Therefore a relatively weak electromagnetic force is sufficient to move or pull in the armature 38 toward the coil 30. The coil 30 is provided with a sufficient number of turns that the armature 38 will be attracted weakly when the current through the main winding and the coil 30 is 5.5 amperes. Under this low current, as long as the current does not exceed about seven amperes, the armature will only be pulled in as far as it has the assistance of the contact member 52 as shown in Figure 9.

The contact 153 will engage the contact 56. This closes the phase winding circuit since the contact 56 is connected by a conductor 90 through an optional capacitor 190 with one terminal of the phase winding 92. The opposite terminal of the phase winding 92 of the motor 88 is connected to a common junction with the main winding 86. This common junction is connected to the supply conductor 94. The other terminal of the main winding 86 is connected by the conductor 84 to the terminal 82 which is connected by the conductor 80 to the electromagnet coil 30. The current through both windings will cause the motor to start. Between peak torque and balance speed, the current in the main winding circuit and the relay will fall below 5.3 amperes and the electromagnetic force will be insufficient to hold the armature 38. In its release, the armature 38 will then reengage the spring arm 154 and return the contact arm 52 and the contact 153 to the position shown in Figure 1. This is the operation of the relay in its low voltage range below about 107 volts.

When the supply voltage and the main winding current are at higher values such as above 107 volts and 7.5 amperes respectively, the electromagnetic attraction of the armature 38 will be sufficient to attract and pull the armature 38 in until the felt stop 44 provided upon the adjacent face of the lead weight 40 engages the electromagnet coil 30. This movement reaches a critical point when the contact 153 engages the contact 56 and thus takes away the principal spring force of the spring contact arm 52. The splitting of the contact arm 52 provides a resilient projection which deflects when the contact 153 thereon engages the stationary contact 56 and also provides an auxiliary spring arm 154 which after the engagement springs counterclockwise and continues to engage and move the lead weight 40 and the armature 38 through this critical period until it reaches a zone wherein the magnetic attraction is sufficient to continue the movement until the felt pad 44 is stopped by the coil 30.

At the start of this movement, as shown in Figure 1, the spring arm 154 is deflected by the force it is transmitting to the lead weight 40 and the armature 38. This stores a limited spring force in this auxiliary spring arm 154 which is transmitted during the critical period to the lead weight 40 and the armature 38 immediately after the contact 153 engages the stationary contact 56 assisting the armature 38 through the critical period until the armature enters a stronger portion of the magnetic field. The hook portion 22 of the pole piece 26 is made with an unusually wide air gap relative to the adjacent end of the armature 38 so that in the position shown in Figure 10, the force will not be too much higher than the magnetic force in the position shown in Figure 9. Preferably the gap between the end of the armature 38 and the bent over portion 22 is between about .032" and .040".

Figure 11:
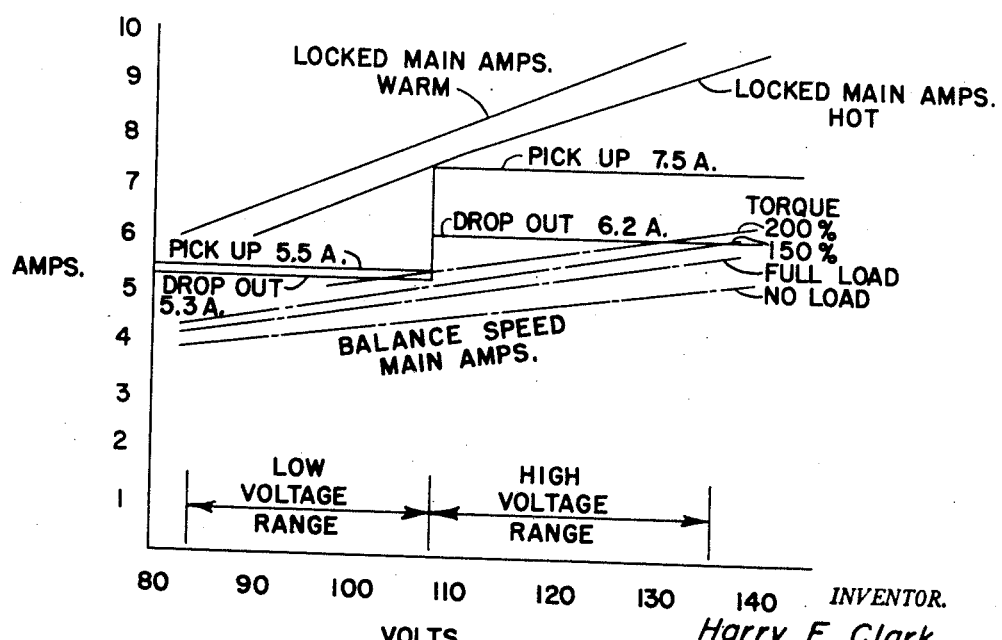
Figure 11 is a diagram illustrating the amperes in the main winding circuit under various conditions throughout a wide range of voltage plotted against the pick up and drop out flux of the starting relay in the two ranges of operation.

To further reduce the difference in amperes between the pick up of the armature 38 and its drop out point the electromagnet coil 30 is provided with a short circuited winding 132 of approximately fifteen turns. This is done by bringing the conductor 78 through an aperture in the midpoint of a core strip 26 as shown in Figure 6 then winding fifteen turns consecutively in the downward direction and bonding the lower loop to the conductor 78 with a good electrical connection designated by the reference character 133 at their crossing point as shown in Figure 6. There is then wound a second layer consecutively from the connection 133 upwardly to the bent over portion 22 as designated by the reference character 134 in Figure 7. This second layer preferably has about twenty-four turns. From the end of the second layer there is a third layer 135 of ten additional turns which is wound consecutively downwardly as illustrated in Figure 8 and which terminates in the connection 80. The short circuited coil in addition to the other features of the relay further reduces the static differential of the relay about 10 to 20% but appears to reduce the dynamic differential a greater amount under the actual conditions of operation. This is important in extending the use of the relay to higher voltages as indicated in Figure 11. It makes it possible for the relay to drop out when the voltage is higher than 130 and the load is about 150% full load.

The theory applying to the short circuited coil is not clearly understood in all of its aspects. However, it appears that during the starting period energy is stored in this short circuited coil 132. Toward the end of the starting period when the main winding current and the current in the remaining portions of the coils 134 and 135 fall rapidly, the energy stored in the short circuited coil 132 gives up its energy in a manner which opposes the flux or magnetic force being generated by the main winding current in the coil portions 134 and 135. The flux generated by the coils 134 and 135 lags the current in these coils by about 90°. The current in the short circuited coil 132 lags the flux generated by the coils 134 and 135 by about 90° and the flux generated by the coil 132 will lag its coil by about 90° so that the flux generated by the coil 132 will be about 180° from the phase of the flux generated by the coils 135 and 134.

It might be simpler to consider that the coils 134 and 135 act as the primary of a transformer during the time that the current is rising in them and the short circuited coil 132 is then acting as the secondary of a transformer. When the current is falling in the coils 134 and 135, the short circuited coil 132 then acts as the primary of a transformer while the coils 134 and 135 act as the secondary of the transformers. Whatever the proper theory may be, the tests show that the differential of the relay under the conditions of operation is substantially reduced by providing the short circuited coil 132 as shown in the drawings.

Figure 10:
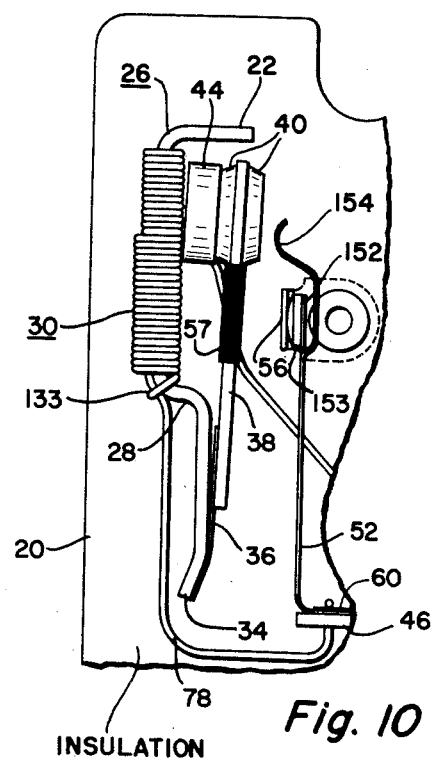
Figure 10 is a similar view showing the armature and contact mechanism in the high range closed position.

This makes it possible for the relay to drop out from the position shown in Figure 10 at a sufficiently high value such as 6.2 amperes to open the phase winding circuit under a load about 150% and at a voltage as high as 135 volts supply voltage. Therefore, by arranging for this two-step operation of the starting relay, the range of supply voltage upon which the system can be used is nearly doubled. It is also possible to use the same relay for slightly smaller or larger motors such as 1/8 or 1/7 horse power. By slightly changing some of the features this relay may be adapted to other smaller and larger motors such as 1/16 to 1/4 horse power. This can be done by changing the main winding, by bending the extension 34 or changing the thickness of the spring 36 or changing the spring force or the thickness of the leaf spring contact member 52. The air gap between the end of the armature 38 and the bent over portion 22 may also be changed as well as the shape of the auxiliary spring arm 154. All these settings may be changed in order to enlarge the range of usefulness without substantially effecting the manufacture of the relay.

When the alternating current causes vibration of the armature 38 in the position shown in Figure 9, the spring arm 154 absorbs these vibrations and prevents their transmission to the contact 153 to keep it continuously in contact with the stationary contact 56 to prevent arcing. The lead weight 40 not only prevents chattering of the relay because of the alternating current fluctuations but it also assists in the dropping out or opening of the relay since by its inertia, when the armature 38 is released from the position shown in Figure 10 it will move continuously with sufficient force to the position shown in Figure 1. The opening of the contacts 153 and 56 will open the phase winding circuit causing an immediate drop in the main winding current so that the relay will not reclose even though the opening movement begins at a current of 6.2 amperes which is higher than the low range pick up current of 5.5 amperes.

In accordance with the provisions of Rule 78a, reference is made to the following prior filed applications:

S. N. 404,134 filed January 29, 1954, and S. N. 368,143, filed July 15, 1953.

While the form of embodiment of the invention as herein disclosed constitutes a preferred form, it is to be understood that other forms might be adopted, as may come within the scope of the claims which follow.

What is claimed is as follows:

1. A control including a spring contact means having an inherent spring force biasing it to closed position, an armature having a released position in which it engages and opens said contact means, an electromagnet magnetically associated with said armature to pull said armature away from the contact means, said armature having a fully attracted position at the limit of its movement toward the electromagnet, said contact means being provided with a spring element for moving said armature toward its attracted position after the closing of the contact means.

2. A control including a normally stationary contact, a leaf spring contact means having a light inherent spring bias carrying it into contact with said contact, an armature biased to engage and move said contact means to open position away from said stationary contact, said contact means being provided with an auxiliary spring arm having a light inherent spring bias in the direction of and contacting said armature after engagment of said contact means with said contact for assisting the movement of the armature away from said contact means, and electromagnetic means magnetically associated with said armature for attracting said armature.

3. A control including a normally stationary contact, a leaf spring contact means having a light inherent spring bias carrying it into contact with said contact, an armature biased to engage and move said contact means to open position away from said stationary contact, said leaf spring contact means being split to form a spring contact arm and an auxiliary spring arm adapted to extend into engagement with said armature when said contact arm is in engagement with said contact and having a light inherent spring bias in the direction of said armature during said engagement, and electromagnetic means magnetically associated with said armature for attracting said armature.

References Cited in the file of this patent

UNITED STATES PATENTS

| | | |
|---|---|---|
| 2,431,025 | Buell | Nov. 18, 1947 |
| 2,491,643 | Burks | Dec. 20, 1949 |
| 2,573,404 | Clark | Oct. 30, 1951 |
| 2,588,257 | Lewus | Mar. 4, 1952 |
| 2,658,175 | Clark | Nov. 3, 1953 |